J. F. COMEE.
CAR DOOR HANGER.
APPLICATION FILED MAY 10, 1915.
1,166,661. Patented Jan. 4, 1916.
2 SHEETS—SHEET 1.
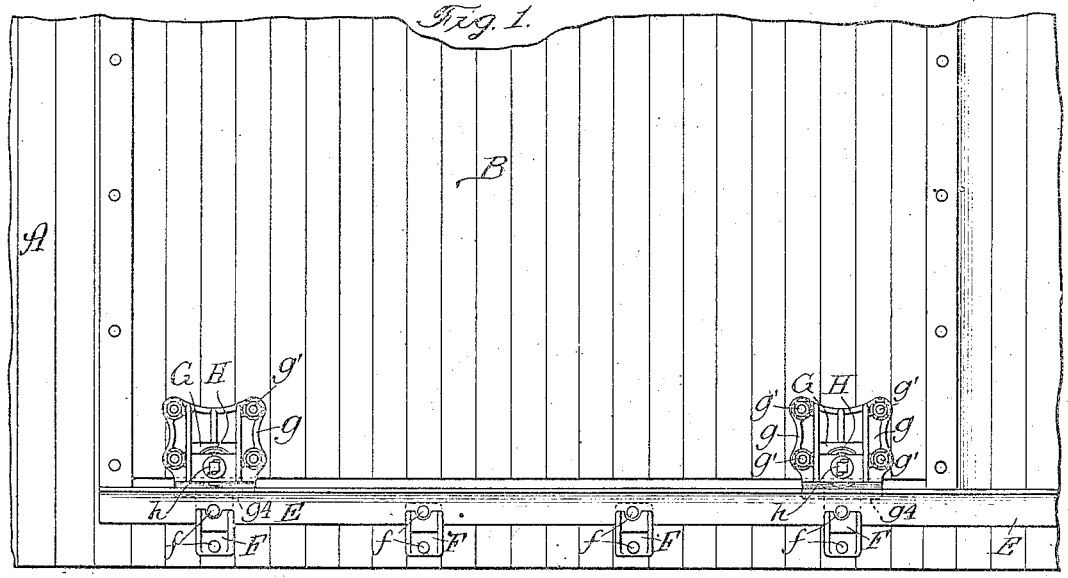
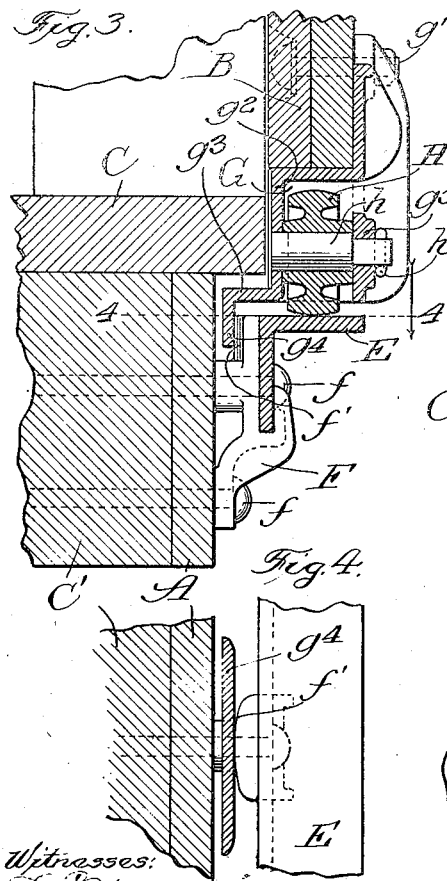
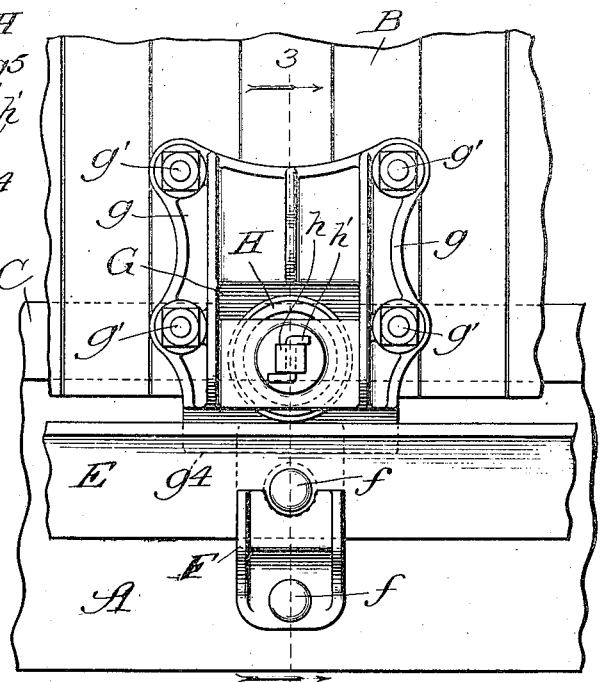

J. F. COMEE.
CAR DOOR HANGER.
APPLICATION FILED MAY 10, 1915.
1,166,661.
Patented Jan. 4, 1916.
2 SHEETS—SHEET 2.
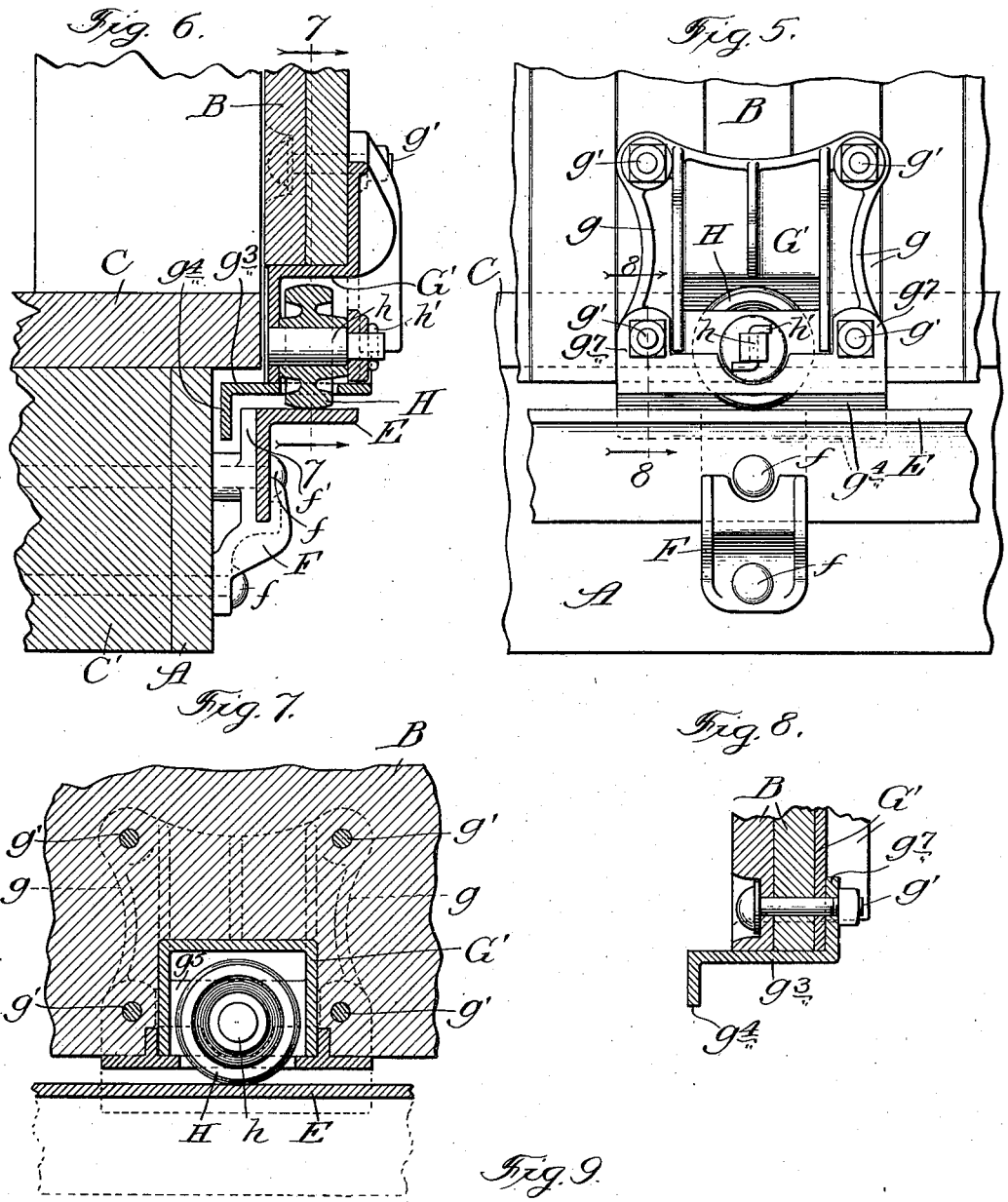
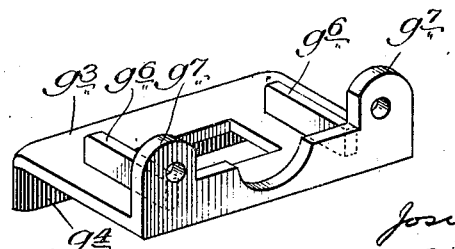

UNITED STATES PATENT OFFICE.

JOSEPH F. COMEE, OF CHICAGO, ILLINOIS, ASSIGNOR TO CAMEL COMPANY, OF CHICAGO, ILLINOIS, A CORPORATION.

CAR-DOOR HANGER.

1,166,661.  Specification of Letters Patent.  Patented Jan. 4, 1916.

Application filed May 10, 1915. Serial No. 27,252.

*To all whom it may concern:*

Be it known that I, JOSEPH F. COMEE, a citizen of the United States, and a resident of the city of Chicago, county of Cook, and State of Illinois, have invented certain new and useful Improvements in Car-Door Hangers, of which I do declare the following to be a full, clear, and exact description, reference being had to the accompanying drawing, forming part of this specification.

This invention has for its object to provide improved mechanism for supporting and guiding the sliding doors of freight cars, and the invention consists in the features hereinafter described, illustrated in the accompanying drawing and particularly pointed out in the claims at the end of this specification.

Figure 1 is a view in side elevation, showing a portion of the side wall of the car and the lower portion of a sliding door having my invention applied thereto. Fig. 2 is a view in side elevation upon an enlarged scale of parts shown in Fig. 1. Fig. 3 is a view in vertical section on line 3—3 of Fig 2. Fig. 4 is a view in horizontal section on line 4—4 of Fig 3. Figs. 5 and 6 are views similar to Figs. 2 and 3 but showing a modified form of the invention. Fig. 7 is a view in vertical section on line 7—7 of Fig 6. Fig 8 is a view in vertical section on line 8—8 of Fig. 5. Fig. 9 is a detail perspective view of the lower portion of the roller casing shown in Figs. 5-7 of the drawings.

A designates the side wall of a freight car and B denotes the sliding door thereof. The upper portion of the sliding door may be provided with any convenient means for guiding and holding the same, such for example, as are shown in Letters Patent No. 1,126,403, granted to my assignee January 26, 1915.

Through the doorway that will be closed by the sliding door B extends the floor C, this floor passing over the sill C' and projecting, as shown in Fig. 3, a slight distance beyond the side wall A of the car. Below the doorway of the car and at a distance to one side thereof extends a track bar E that is held at a slight distance from the side wall of the car by means of brackets F attached to the car body by suitable through bolts *f*. Each of the brackets F is formed in its upper portion with a channel or recess to receive the lower vertical member of the track bar E and one or both of the end brackets F is preferably formed with an upward extension having a cam-shaped inner face *f'*, the purpose of which will hereinafter more fully appear. The lower edge of the door B is formed with a plurality of recesses or pockets adapted to receive the casings G for the bearing rollers H. In the preferred form of the invention shown on Sheet 1 of the drawings, each of the casings G has a chambered body portion adapted to set within the corresponding pocket or recess formed in the lower edge of the door, and each of the casings G is formed with flanges *g* adapted to overlap the outer face of the door and to receive through bolts *g'* whereby the casings are securely attached to the door. Each of the casings G comprises an upper vertical member $g^2$ the inner face of which extends approximately in line with the inner face of the door B, with a horizontal member $g^3$ that extends inwardly beneath the projecting portion of the car floor C and with a downwardly extending, inner, vertical member $g^4$ that projects into the space between the track bar E and the side wall A of the car.

By reference to Fig. 4 of the drawings, it will be noticed that the ends of the downwardly extending members $g^4$ are beveled so as to enable these members to readily engage with the curved or cam-shaped faces of the upward extension *f'* on the brackets F as the door is moved to closed position. The purpose of these cam-shaped upward extensions *f'* is to coöperate with the downwardly extending members $g^4$ in drawing the door more tightly against the casing when the door is closed and thus aid in more effectively excluding dust, rain, snow, or the like, from the car. Each of the bearing rollers H is mounted on a pintle *h* which extends through the inner member $g^2$ of the casing and through the outer face $g^5$ of the casing, the reduced outer end of the pintle *h* being furnished with a cotter pin *h'* passing therethrough.

From the foregoing description it will be seen that when the parts are in the position for use, as shown, the lower edge of the door B is brought very close to the horizontal member of the track bar E and below the line of the car floor C, thereby more effectively guarding the track bar against the accumulation of ice, etc., thereon; and by this arrangement, also, the danger of snow, rain or the like being driven in below the lower edge of the door is correspondingly diminished. The inward extension of the horizontal member $g^3$ beneath the outwardly projecting portion of the floor C effectively serves to guard against the lifting of the door, and the downwardly extending member $g^4$ of the casing G, being arranged in the space between the track bar E and the side wall A of the car, effectively serves to guard against the outward displacement of the car door.

In the form of my invention illustrated on Sheet 2 of the drawings, the casing G' is shown as made of two parts. In this construction, the upper part of the casing is provided with the flanges $g$ for the through bolts $g'$ and the rollers H are journaled in the casings, as in the form of the invention illustrated in Sheet 1 of the drawings; but on Sheet 2 of the drawings, the lower part of the casing is shown as formed separate from the upper part and bolted thereto. Thus, by reference more particularly to Fig. 9 of the drawings, it will be seen that the lower part of the casing, in this modified form of my invention, comprises a bottom plate having preferably upright parts or flanges $g^6$ to engage with the depending side portions of the upper part of the casing (see Fig. 7). So, also, the lower part of the casing is formed with flanges $g^7$ (see Figs. 5, 8 and 9) that overlap the lower portions of the flanges $g$ of the upper part of the casing and are held in place by the lower set of through bolts $g'$. In this modified form of the invention, the bottom plate of the casing is extended inward to form the horizontal member $g^3$ and downward to form the inner vertical member $g^4$, the member $g^3$ extending beneath the outwardly projecting part of the car floor C, while the member $g^4$ extends into the space between the track bar E and the side wall of the car. The ends of the member $g^4$ are rounded off so as to better engage with the upstanding portions $f'$ of the end brackets F.

It will be understood, of course, that the details of construction above set forth may be modified without departing from the scope of the invention.

I claim as my invention:

1. The combination with a car body having a doorway and with a sliding door for closing said doorway, of a track bar secured to and spaced from the side wall of the car in proximity to and beneath the bottom edge of the door, said door having a recess in its bottom edge, a casing setting within said recess, said casing being flanged for bolting to the door and having a downwardly projecting member extending into the space between said track bar and the side wall of the car, and a bearing roller within said casing having its lower portion projecting slightly below the bottom edge of the door and resting upon said track bar.

2. The combination with a car body having a doorway and with a sliding door for closing said doorway, of a track bar secured to and spaced from the side wall of the car and beneath the bottom edge of the door, a casing bolted to the door and having at its bottom an inwardly extending horizontal member provided with a downwardly projecting member extending into the space between said track bar and the side wall of the car, and a bearing roller within said casing and resting upon said track bar.

3. The combination with a car body having a doorway and having a floor projecting beyond the side wall of the car and with a sliding door for closing said doorway, of a track bar secured to and spaced from the side wall of the car in proximity to and beneath the bottom edge of the door, the bottom of said door being formed with a recess, a casing setting within said recess, said casing having its outer portion flanged to overlap the outer face of the door and provided at its bottom with a horizontal member extending inwardly beneath the projecting portion of the floor, and a vertical member extending into the space between the track bar and the side wall of the car, and a bearing roller within said casing and resting upon said track bar.

4. The combination with a car body having a doorway and with a sliding door for closing said doorway, of a track bar secured to and spaced from the side wall of the car beneath the bottom edge of the door, a bracket for sustaining said track bar having its upper portion formed with a cam-shaped surface, a casing secured to the lower portion of the door, said casing being provided with a vertical, downwardly projecting member extending into the space between said track bar and the side wall of the car, said member having beveled ends to engage the cam surfaces of said bracket, and a bearing roller within said casing and resting upon said track bar.

JOSEPH F. COMEE.

Witness:
 GEO. P. FISHER.